US012597978B2

(12) United States Patent
Lin et al.

(10) Patent No.: US 12,597,978 B2
(45) Date of Patent: Apr. 7, 2026

(54) BEAM SELECTION FOR HIGHER UPLINK PERFORMANCE IN VIEW OF EXPOSURE LIMITS

(71) Applicant: QUALCOMM Incorporated, San Diego, CA (US)

(72) Inventors: Jing Lin, Milpitas, CA (US); Tienyow Liu, Santa Clara, CA (US); Raghu Narayan Challa, San Diego, CA (US); Jagadish Nadakuduti, Bermuda Dunes, CA (US); Lin Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 18/047,845

(22) Filed: Oct. 19, 2022

(65) Prior Publication Data

US 2023/0122075 A1 Apr. 20, 2023

Related U.S. Application Data

(60) Provisional application No. 63/257,759, filed on Oct. 20, 2021.

(51) Int. Cl.
*H04B 7/06* (2006.01)
*H04W 52/24* (2009.01)
(Continued)

(52) U.S. Cl.
CPC ...... *H04B 7/06952* (2023.05); *H04W 52/241* (2013.01); *H04W 52/367* (2013.01); *H04W 52/42* (2013.01)

(58) Field of Classification Search
CPC .............. H04B 7/0695; H04B 7/06952; H04B 1/3838; H04B 17/336; H04W 52/241; H04W 52/367; H04W 52/42
See application file for complete search history.

(56) References Cited

U.S. PATENT DOCUMENTS

| | | | |
|---|---|---|---|
| 2014/0139372 | A1 | 5/2014 | Seol et al. |
| 2014/0185481 | A1 | 7/2014 | Seol et al. |

(Continued)

FOREIGN PATENT DOCUMENTS

| | | | | |
|---|---|---|---|---|
| EP | 3481113 A1 | * | 5/2019 | .......... H04B 7/0486 |
| EP | 3886336 A1 | | 9/2021 | |

(Continued)

OTHER PUBLICATIONS

"Enhancement on multi-beam operation", R1-2100588, 3GPP TSG RAN WG1 #104-e e-Meeting, Jan. 25-Feb. 5, 2021 (Year: 2021).*

(Continued)

*Primary Examiner* — Ayaz R Sheikh
*Assistant Examiner* — David Zhijun Sun
(74) *Attorney, Agent, or Firm* — Patterson & Sheridan, L.L.P/Qualcomm Incorporated

(57) ABSTRACT

Techniques and apparatus for beam selection in compliance with radio frequency (RF) exposure limits. A method that may be performed by a wireless device includes receiving, from another wireless device, a plurality of signals via a plurality of beams; measuring a received signal power for each of the beams, based on the received plurality of signals; determining a transmit power limit for each of the beams based at least in part on an RF exposure limit; determining an estimation of a signal quality at the other wireless device for each of the beams based at least in part the received signal powers and the transmit power limits; selecting one of the beams based on the estimations of the signal qualities for the beams; and transmitting a signal via the selected beam.

30 Claims, 10 Drawing Sheets

(51) Int. Cl.
    *H04W 52/36*       (2009.01)
    *H04W 52/42*       (2009.01)

(56)                References Cited

U.S. PATENT DOCUMENTS

| | | | |
|---|---|---|---|
| 2018/0167897 A1 | 6/2018 | Sampath et al. | |
| 2020/0015171 A1 | 1/2020 | Nadakuduti et al. | |
| 2020/0059867 A1 | 2/2020 | Haghighat et al. | |
| 2020/0112926 A1* | 4/2020 | Laghate | H04B 7/0695 |
| 2020/0145079 A1 | 5/2020 | Marinier et al. | |
| 2020/0374818 A1 | 11/2020 | Cai et al. | |
| 2020/0389850 A1 | 12/2020 | He et al. | |
| 2020/0413388 A1 | 12/2020 | John Wilson et al. | |
| 2021/0282093 A1* | 9/2021 | Taherzadeh Boroujeni | H04W 52/247 |
| 2021/0297104 A1* | 9/2021 | Zhou | H04W 52/42 |
| 2022/0006507 A1* | 1/2022 | Guan | H04B 1/3827 |

FOREIGN PATENT DOCUMENTS

| | | |
|---|---|---|
| WO | 2020192408 A1 | 10/2020 |
| WO | 2022197652 A1 | 9/2022 |

OTHER PUBLICATIONS

Ericsson: "Remaining Issues on Multi-beam Enhancements", 3GPP Tsg-Ran WG1 Meeting #106bis-e, R1-2109110, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, pp. 1-23, XP052058070, Section 2.4.2.

Mediatek Inc: "Enhancement on Multi-Beam Operation", 3GPP TSG RAN WG1 #104-e, R1-2100588, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971059, 27 Pages, Section 2.4.2, Figure 8.

Partial International Search Report—PCT/US2022/078404—ISA/EPO—Feb. 2, 2023.

VIVO: "Further Discussion on Multi Beam Enhancement", 3GPP TSG RAN WG1 #106b-e, R1-2108951, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 26 Pages, XP052057786, Section 5.

CATT: "Enhancements on Multi-Beam Operation", 3GPP TSG RAN WG1 #105-e, R1-2104484, 3rd Generation Partnership Project, Mobile Competence Centre, 650, Route Des Lucioles, F-06921 Sophia-Antipolis Cedex, France, Vol. RAN WG1, No. e-Meeting, May 19, 2021-May 27, 2021, May 12, 2021, XP052010807, 12 pages, Sections 2.5.

International Search Report and Written Opinion—PCT/US2022/078404—ISA/EPO—Apr. 3, 2023.

Liu T., et al., "Radio Exposure Optimization and Beam Selection Algorithm Exploiting Spatial Diversity Under Maximum Permissible Emission Limit", Qualcomm, Oct. 7, 2020, 9 pages.

* cited by examiner

400A

400B

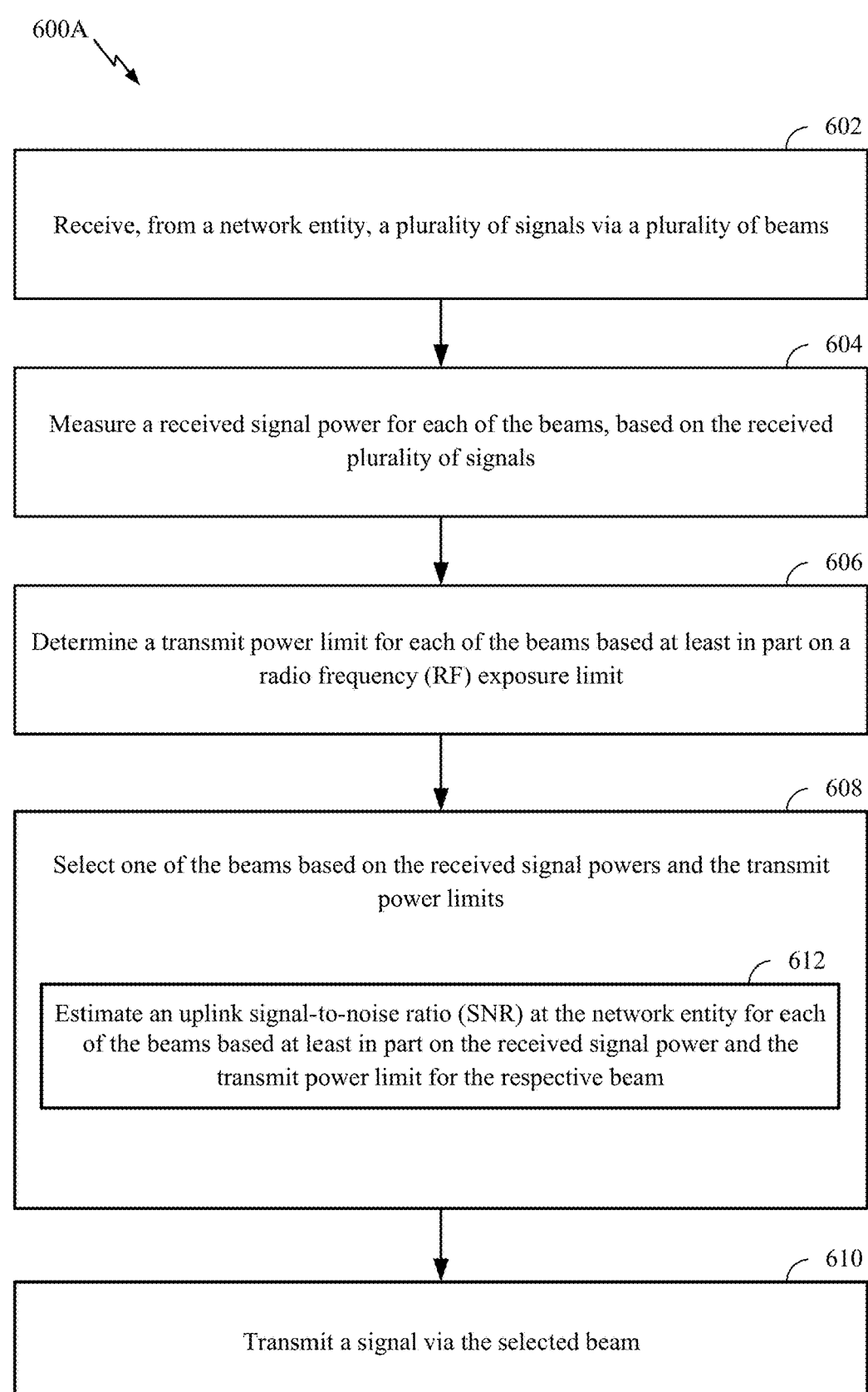

600A

602

Receive, from a network entity, a plurality of signals via a plurality of beams

604

Measure a received signal power for each of the beams, based on the received plurality of signals

606

Determine a transmit power limit for each of the beams based at least in part on a radio frequency (RF) exposure limit

608

Select one of the beams based on the received signal powers and the transmit power limits

612

Estimate an uplink signal-to-noise ratio (SNR) at the network entity for each of the beams based at least in part on the received signal power and the transmit power limit for the respective beam

610

Transmit a signal via the selected beam

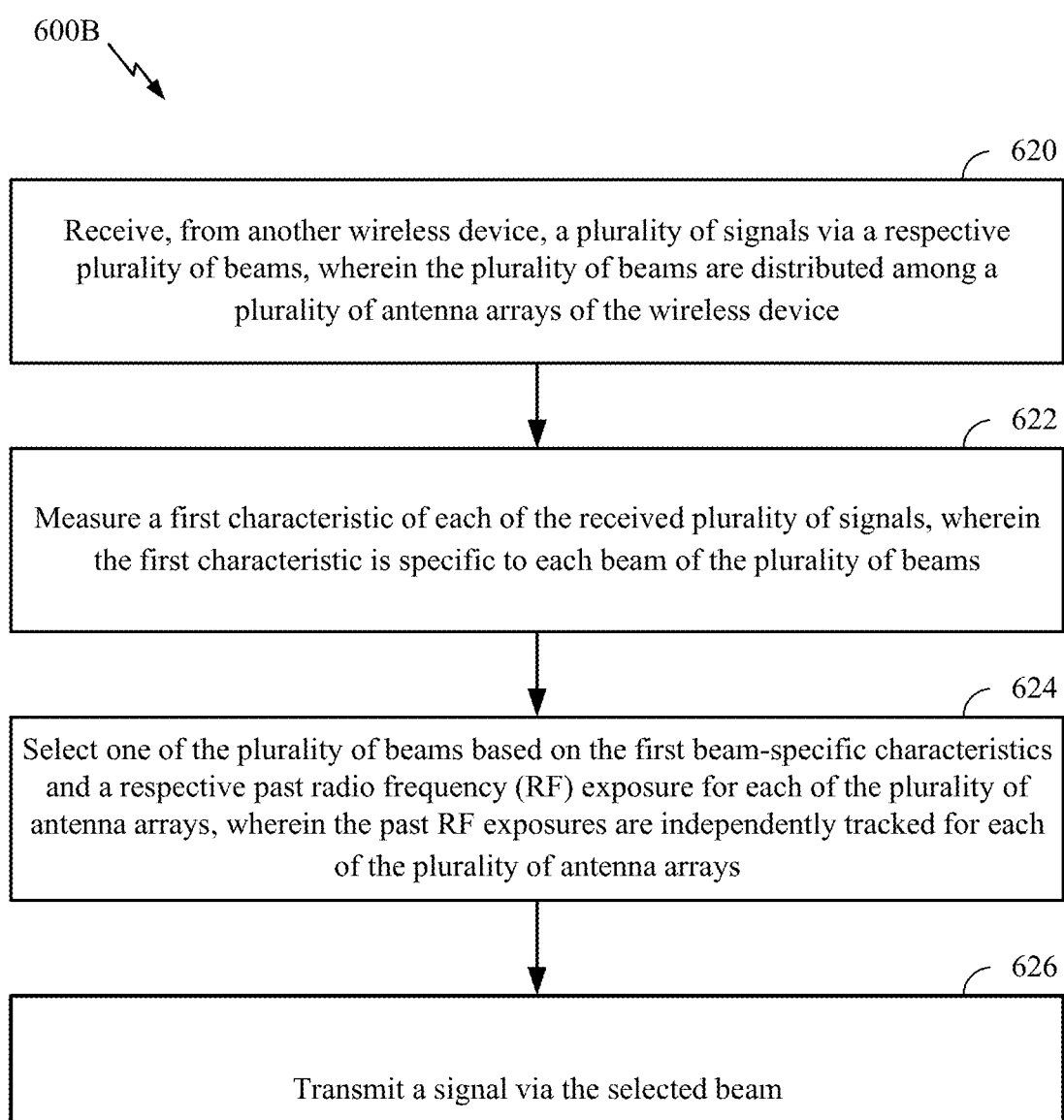

620

Receive, from another wireless device, a plurality of signals via a respective plurality of beams, wherein the plurality of beams are distributed among a plurality of antenna arrays of the wireless device

622

Measure a first characteristic of each of the received plurality of signals, wherein the first characteristic is specific to each beam of the plurality of beams

624

Select one of the plurality of beams based on the first beam-specific characteristics and a respective past radio frequency (RF) exposure for each of the plurality of antenna arrays, wherein the past RF exposures are independently tracked for each of the plurality of antenna arrays

626

Transmit a signal via the selected beam

BEAM SELECTION FOR HIGHER UPLINK PERFORMANCE IN VIEW OF EXPOSURE LIMITS

CROSS-REFERENCE TO RELATED APPLICATION

The present Application for Patent claims benefit of U.S. Provisional Application No. 63/257,759, filed Oct. 20, 2021, which is hereby expressly incorporated by reference herein in its entirety.

BACKGROUND

Field of the Disclosure

Aspects of the present disclosure relate to wireless communications, and more particularly, to techniques for transmitting in compliance with certain radio frequency exposure limits.

Description of Related Art

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices must currently undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable transmit powers in compliance with radio frequency (RF) exposure limits.

Certain aspects of the subject matter described in this disclosure can be implemented in a method for wireless communication, for example, by a wireless communication device. The method generally includes receiving, from another wireless device, a plurality of signals via a plurality of beams and measuring a received signal power for each of the beams, based on the received plurality of signals. The method also includes determining a transmit power limit for each of the beams based at least in part on a RF exposure limit; selecting one of the beams based on the received signal powers and the transmit power limits; and transmitting a signal via the selected beam.

Certain aspects of the subject matter described in this disclosure can be implemented in an apparatus for wireless communication. The apparatus generally includes a memory and a processor coupled to the memory. The processor and the memory are configured to receive, from a wireless device, a plurality of signals via a plurality of beams;

measure a received signal power for each of the beams, based on the received plurality of signals; determine a transmit power limit for each of the beams based at least in part on a RF exposure limit; select one of the beams based on the received signal powers and the transmit power limits; and transmit a signal via the selected beam.

Certain aspects of the subject matter described in this disclosure can be implemented in an apparatus for wireless communication. The apparatus generally includes means for receiving, from a wireless device, a plurality of signals via a plurality of beams; means for measuring a received signal power for each of the beams, based on the received plurality of signals; means for determining a transmit power limit for each of the beams based at least in part on a RF exposure limit; means for selecting one of the beams based on the received signal powers and the transmit power limits; and means for transmitting a signal via the selected beam.

Certain aspects of the subject matter described in this disclosure can be implemented in a computer-readable medium. The computer-readable medium has instructions stored thereon for receiving, from a wireless device, a plurality of signals via a plurality of beams; measuring a received signal power for each of the beams, based on the received plurality of signals; determining a transmit power limit for each of the beams based at least in part on a RF exposure limit; selecting one of the beams based on the received signal powers and the transmit power limits; and transmitting a signal via the selected beam.

Certain aspects of the subject matter described in this disclosure can be implemented in a method for wireless communication, for example, by a wireless communication device. The method generally includes receiving, from another wireless device, a plurality of signals via a plurality of beams and measuring a received signal power for each of the beams, based on the received plurality of signals. The method further includes determining a transmit power limit for each of the beams based at least in part on a radio frequency (RF) exposure limit and determining an estimation of a signal quality at the other wireless device for each of the beams based at least in part on the received signal powers and the transmit power limits. The method also includes selecting one of the beams based on the estimations of the signal qualities for the beams and transmitting a signal via the selected beam.

Certain aspects of the subject matter described in this disclosure can be implemented in an apparatus for wireless communication. The apparatus generally includes a memory and a processor coupled to the memory. The processor is configured to measure a received signal power for each of the beams, based on the received plurality of signals, determine a transmit power limit for each of the beams based at least in part on a radio frequency (RF) exposure limit, determine an estimation of a signal quality at the wireless device for each of the beams based at least in part on the received signal powers and the transmit power limits, select one of the beams based on the estimations of the signal qualities for the beams, and transmit a signal via the selected beam.

Certain aspects of the subject matter described in this disclosure can be implemented in an apparatus for wireless communication. The apparatus generally includes means for receiving, from another wireless device, a plurality of signals via a plurality of beams; means for measuring a received signal power for each of the beams, based on the received plurality of signals; means for determining a transmit power limit for each of the beams based at least in part on a radio frequency (RF) exposure limit; means for determining an estimation of a signal quality at the other wireless device for each of the beams based at least in part on the received signal powers and the transmit power limits; means for selecting one of the beams based on the estimations of the signal qualities for the beams; and means for transmitting a signal via the selected beam.

Certain aspects of the subject matter described in this disclosure can be implemented in a computer-readable medium. The computer-readable medium has instructions stored thereon for receiving, from another wireless device, a plurality of signals via a plurality of beams; measuring a received signal power for each of the beams, based on the received plurality of signals; determining a transmit power limit for each of the beams based at least in part on a radio frequency (RF) exposure limit; determining an estimation of a signal quality at the other wireless device for each of the beams based at least in part on the received signal powers and the transmit power limits; selecting one of the beams based on the estimations of the signal qualities for the beams; and transmitting a signal via the selected beam.

Certain aspects of the subject matter described in this disclosure can be implemented in a method for wireless communication, for example, by a wireless communication device. The method generally includes receiving, from another wireless device, a plurality of signals via a respective plurality of beams, wherein the plurality of beams are distributed among a plurality of antenna arrays of the wireless device. The method also includes measuring a first characteristic of each of the received plurality of signals, wherein the first characteristic is specific to each beam of the plurality of beams. The method further includes selecting one of the plurality of beams based on the first beam-specific characteristics and a respective past radio frequency (RF) exposure for each of the plurality of antenna arrays, wherein the past RF exposures are independently tracked for each of the plurality of antenna arrays. The method also includes transmitting a signal via the selected beam.

Certain aspects of the subject matter described in this disclosure can be implemented in an apparatus for wireless communication. The apparatus generally includes a plurality of antenna arrays, a memory, and a processor coupled to the memory. The processor is configured to receive, from a wireless device, a plurality of signals via a respective plurality of beams, wherein the plurality of beams are distributed among the plurality of antenna arrays; measure a first characteristic of each of the received plurality of signals, wherein the first characteristic is specific to each beam of the plurality of beams; select one of the plurality of beams based on the first beam-specific characteristics and a respective past radio frequency (RF) exposure for each of the plurality of antenna arrays, wherein the past RF exposures are independently tracked for each of the plurality of antenna arrays; and transmit a signal via the selected beam.

Certain aspects of the subject matter described in this disclosure can be implemented in an apparatus for wireless communication. The apparatus generally includes means for receiving, from another wireless device, a plurality of signals via a respective plurality of beams, wherein the plurality of beams are distributed among a plurality of antenna arrays of the wireless device; means for measuring a first characteristic of each of the received plurality of signals, wherein the first characteristic is specific to each beam of the plurality of beams; means for selecting one of the plurality of beams based on the first beam-specific characteristics and a respective past radio frequency (RF) exposure for each of the plurality of antenna arrays, wherein the past RF exposures are independently tracked for each of the plurality of antenna arrays; and means for transmitting a signal via the selected beam.

Certain aspects of the subject matter described in this disclosure can be implemented in a computer-readable medium. The computer-readable medium has instructions stored thereon for receiving, from another wireless device, a plurality of signals via a respective plurality of beams, wherein the plurality of beams are distributed among a plurality of antenna arrays of the wireless device; measuring a first characteristic of each of the received plurality of signals, wherein the first characteristic is specific to each beam of the plurality of beams; selecting one of the plurality of beams based on the first beam-specific characteristics and a respective past radio frequency (RF) exposure for each of the plurality of antenna arrays, wherein the past RF exposures are independently tracked for each of the plurality of antenna arrays; and transmitting a signal via the selected beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 6A is a flow diagram illustrating example operations for wireless communication by a UE, in accordance with certain aspects of the present disclosure.

FIG. 6B is a flow diagram illustrating example operations for wireless communication by a UE, in accordance with certain aspects of the present disclosure.

US 12,597,978 B2

Figure 1:
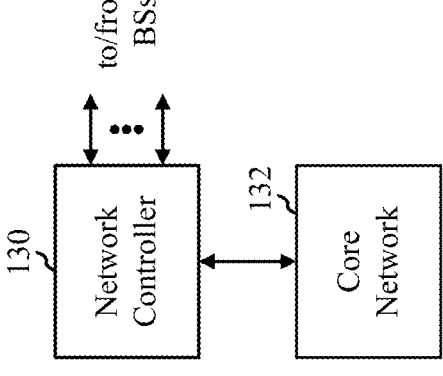
FIG. 1 is a block diagram conceptually illustrating an example wireless communication network, in accordance with certain aspects of the present disclosure.

5 tions for the techniques disclosed herein, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer-readable mediums for beam selection.

To ensure compliance with a radio frequency (RF) exposure limit, wireless communication devices (e.g., a user equipment) may determine a maximum transmission power for a time interval based on an available RF exposure budget, which may be computed based on a maximum available power limit, RF exposure limit, and previous transmission activities (e.g., previous transmit powers). A wireless communication device may have multiple antennas, which can enable the device to transmit via one or more beams at different locations and/or orientations (e.g., azimuth and/or elevation) of the device. In some cases, the RF exposure consumption may be assumed to be additive across all of the antenna modules at the device, such that the RF exposure budget is shared among all of the antenna modules. In certain cases, a link budget parameter, such as downlink (DL) reference signal received power (RSRP), may be used to select an antenna beam for uplink transmission. A beam with a strong RSRP may not be able to transmit with a high power due to the shared RF exposure budget limiting the available transmit power, regardless of the orientation of the beam.

Aspects of the present disclosure provide techniques and apparatus for selecting a beam based on an uplink (UL) signal quality (e.g., signal-to-noise ratio (SNR)), which may convert to a desirable uplink throughput, for example, according to the Shannon channel capacity theorem. The UL signal quality may enable a wireless device to identify a beam with desirable uplink performance compared to relying on the DL RSRP for the beams. The wireless device may consider for each beam the DL RSRP and a transmit power limit associated with an RF exposure limit in estimating the UL SNR for the respective beam. The transmit power limit may represent an average maximum transmit power that the wireless device is predicted or determined to use over a time interval (e.g., a transmission duration or an estimated duration to communicate with the beam). As further described herein, the transmit power limit and the DL RSRP may be used to estimate the UL SNR. In certain aspects, the wireless device may also take into account or consider the uplink traffic duration over a time period or the heaviness of UL and DL traffic over time (e.g., as represented by a ratio or duty cycle between UL and DL traffic over time).

In certain aspects, the wireless device may perform a separate time-averaged RF exposure evaluation for each antenna module, for example, due to the spatial diversity of the antenna modules. The wireless device may track past RF exposure (e.g., RF exposure consumption) per antenna module (or per a group of antennas or antenna modules) over a running time window associated with a time-averaged RF exposure limit, as further described herein. The wireless device may determine the average maximum transmit power based on past RF exposure or transmit powers output by the respective antenna module over a given time interval, as further described herein. The wireless device may estimate an UL signal quality for each beam based on the respective average maximum transmit power and DL RSRP.

The techniques and apparatus for selecting a beam described herein may provide desirable uplink communication performance (e.g., higher uplink throughput, reduced latencies, and/or desirable cell coverage) in compliance with RF exposure limits.

The following description provides examples of beam selection and RF exposure compliance in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

The UE 120a may include a beam selection manager 122 that selects a beam for uplink transmission based on received signal powers and transmit power limits associated with beams, in accordance with certain aspects of the present disclosure. Another wireless device in the wireless communication network 100 may alternatively or additionally include an RF exposure manager. For example, one or more of the BSs 110 may be configured as a customer premises equipment (CPE), and an RF exposure manager configured as described herein may be implemented in a BS or CPE.

The UE 120a may receive a beamformed signal from the base station 110 via one or more of the beams 124 (e.g., in one or more receive directions). The UE 120a may transmit a beamformed signal to the base station 110 via one or more of the beams 124 (e.g., in one or more transmit directions). The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
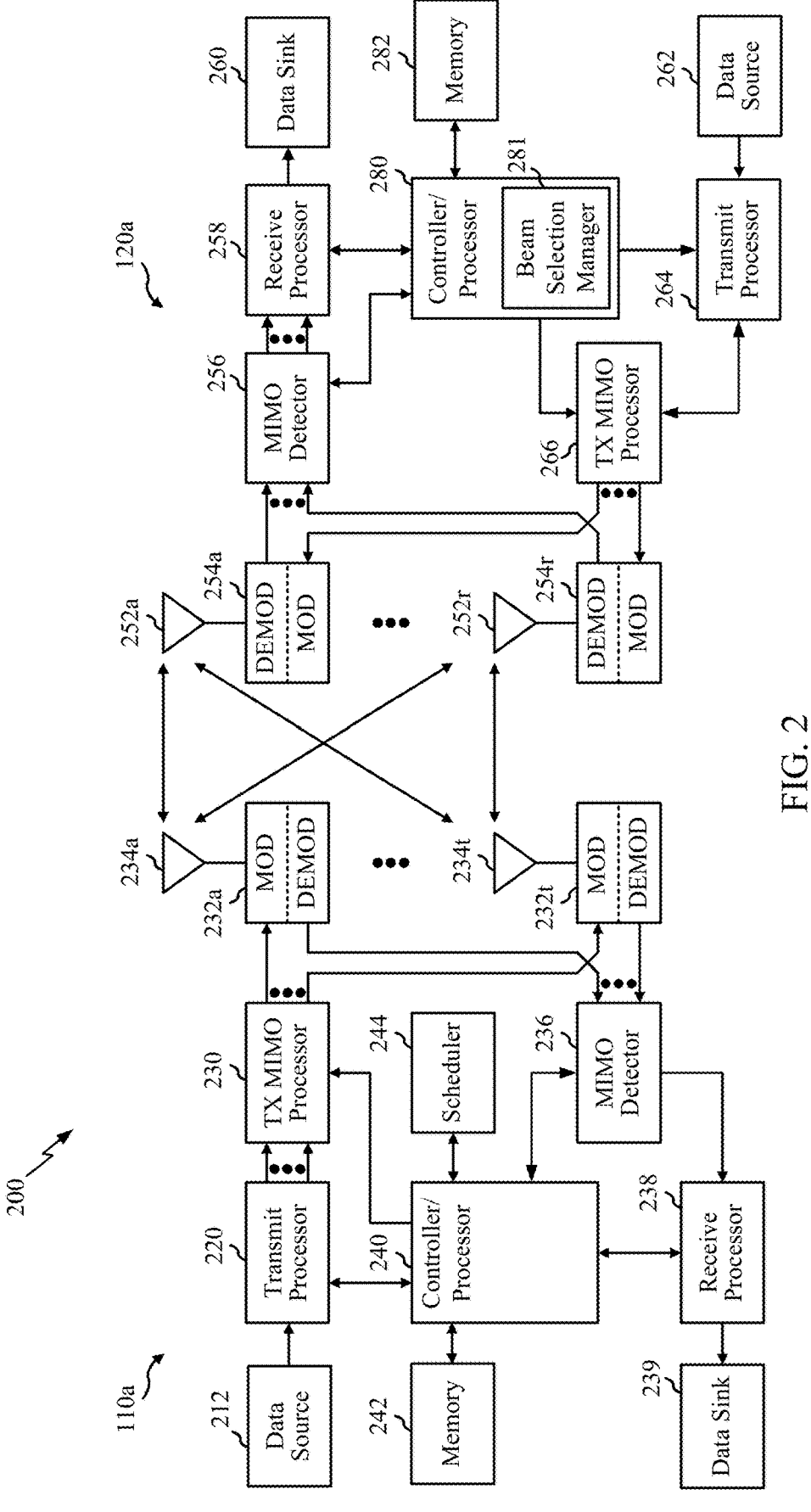
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a beam selection manager 281 that may be representative of the beam selection manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above may be an example of another UE 120.

Further, as described above, the BS 110a may include the beam selection manager (for example, which is configured similarly to the beam selection manager 281) in addition to or instead of the UE 120a. In some examples, the BS 110a as illustrated in FIG. 2 with the addition of an RF exposure manager may be representative of a CPE.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, etc.).

Example RF Transceiver

Figure 3:
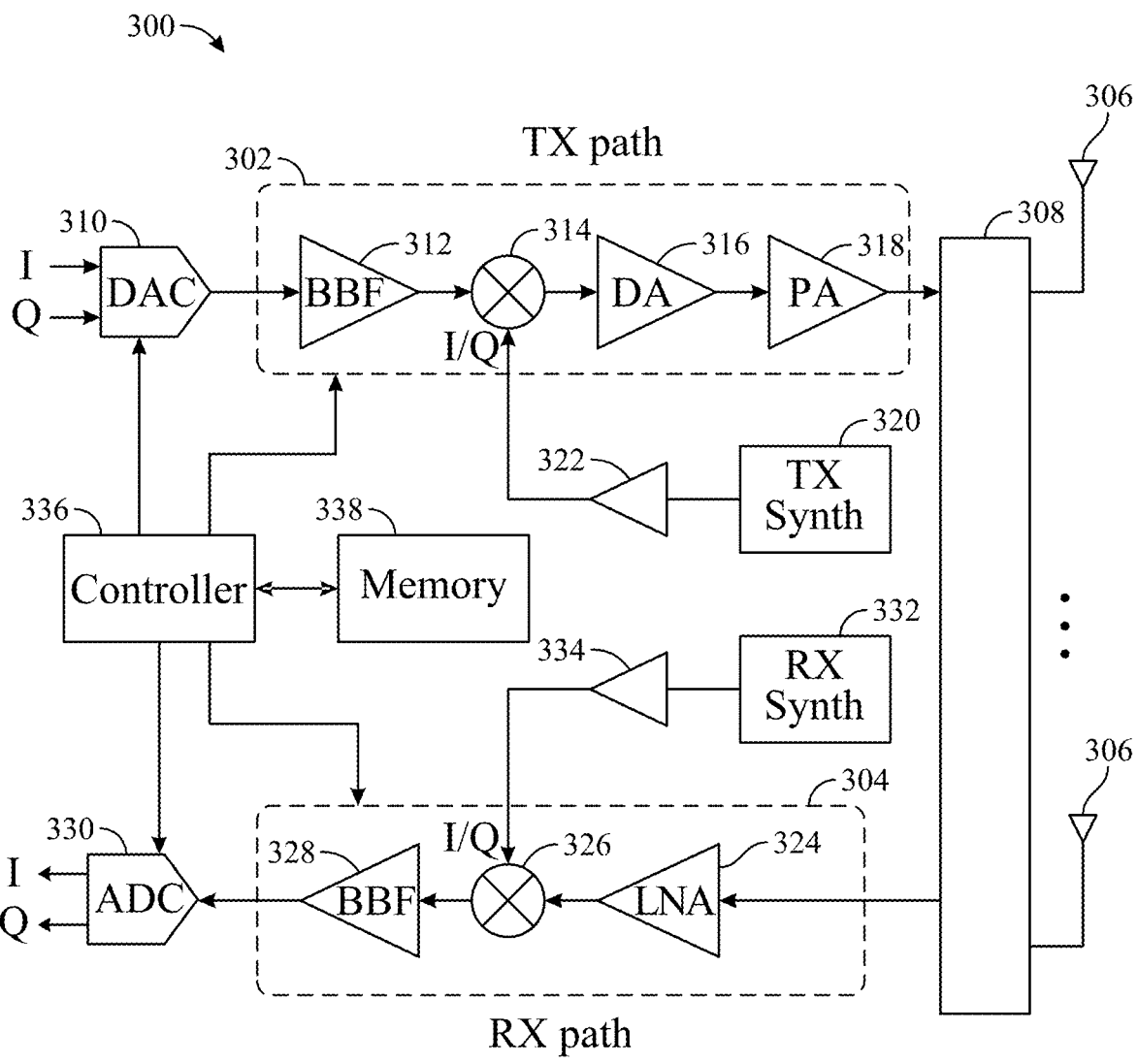
FIG. 3 is a block diagram of an example radio frequency (RF) transceiver, in accordance with certain aspects of the present disclosure.

FIG. 3 is a block diagram of an example RF transceiver circuit 300, which may be used in any of the wireless devices described above, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Some systems may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power limit for the TX path 302 (e.g., certain levels of gain applied to the BBF 312, the DA 316, and/or the PA 318) based on an RF exposure limit (e.g., a time-averaged RF exposure limit) set by domestic/foreign regulations and/or international standards, as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change.

SAR may be used in some configurations to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used in some configurations to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

Figure 4A:
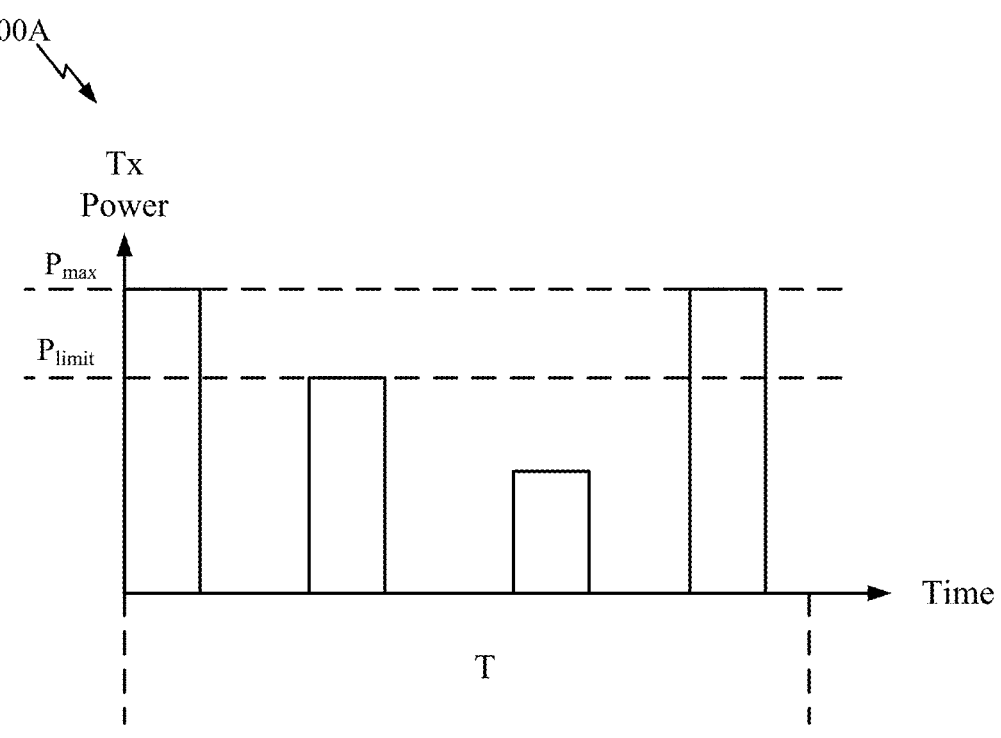
FIGS. 4A and 4B are graphs illustrating examples of transmit powers over time in compliance with an RF exposure limit, in accordance with certain aspects of the present disclosure.

In certain cases, time-averaging of RF exposure may be performed to be in compliance with the RF exposure limit within a specified running time window (T) (e.g., 2 seconds for 60 GHz bands, 100 or 360 seconds for bands≤6 GHz, etc.) associated with the RF exposure limit. For example, FIG. 4A is a graph 400A of a transmit power that varies over the time window (T) associated with the RF exposure limit, in accordance with certain aspects of the present disclosure. As an example, the transmit power may exceed the transmit power threshold $P_{limit}$ in certain transmission occasions in the time window (T). That is, the transmit power may be greater than the transmit power threshold $P_{limit}$. In certain cases, the UE may transmit at $P_{max}$, which is the maximum transmit power supported by the UE. In certain cases, the UE may transmit at a transmit power less than or equal to the transmit power threshold $P_{limit}$ in certain transmission occasions. The transmit power threshold $P_{limit}$ represents the time-averaged threshold for the RF exposure limit in terms of transmit power, and in certain cases, $P_{limit}$ may be referred to as the average power level or limit. The graph 400A also illustrates gaps between transmission bursts, where the gaps represent periods during which no transmission was sent from the device.

Figure 4B:
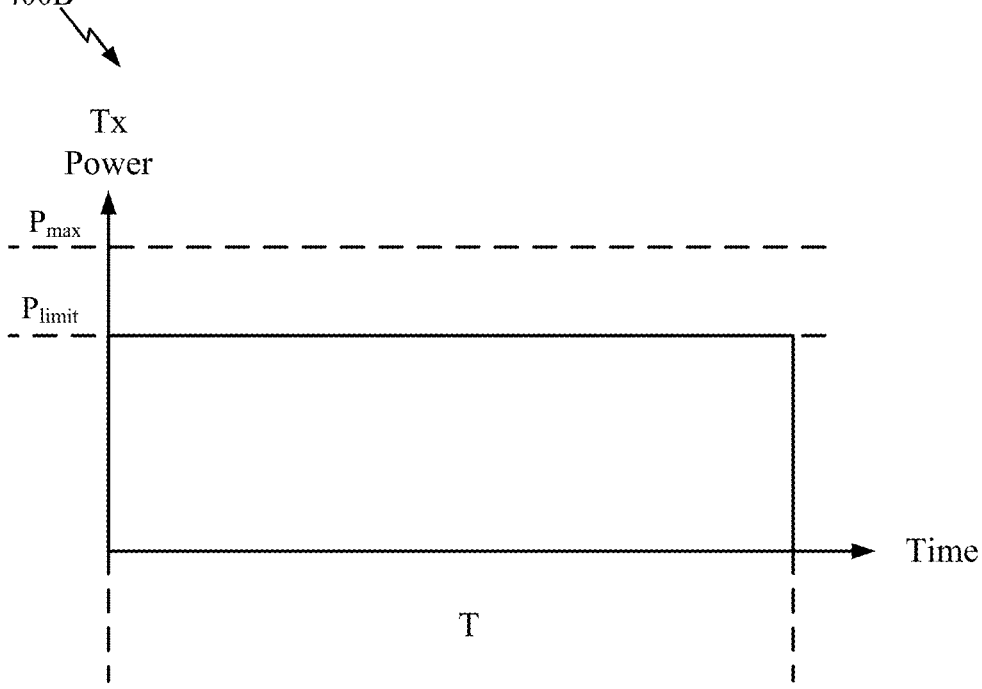

In certain cases, the transmit power may be maintained at the peak transmit power (e.g., $P_{limit}$) allowed for RF exposure compliance that enables continuous transmission during the time window. For example, FIG. 4B is a graph 400B of a transmit power over time illustrating an example where the transmit power is limited to $P_{limit}$, in accordance with certain aspects of the present disclosure. As shown, the UE can transmit continuously at $P_{limit}$ in compliance with the RF exposure limit.

To ensure compliance with an RF exposure limit, wireless communication devices may determine a maximum transmission power for a time interval based on an available RF exposure budget (e.g., a transmit power over the time interval that can still be used for transmitting while fulfilling the time-averaged RF exposure limit), which may be computed based on a maximum available power limit, RF exposure limit, and previous transmission activities (e.g., previous transmit powers). A wireless communication device may have multiple antennas, which can enable the device to transmit via one or more beams at different locations of the device. In some cases, the RF exposure consumption may be assumed to be additive across all of the antenna modules at the device, such that the RF exposure budget is shared among all of the antenna modules. In certain cases, a link budget parameter, such as downlink (DL) reference signal received power (RSRP), may be used to select an antenna beam for uplink transmission. A beam with a strong RSRP may not be able to transmit with a high power due to the shared RF exposure budget limiting the available transmit power, regardless of the orientation of the beam.

Accordingly, what is needed are techniques and apparatus for beam selection that can exploit the spatial diversity of RF exposure limits for higher uplink performance.

Example Beam Selection for Higher Uplink Performance

Figure 5:
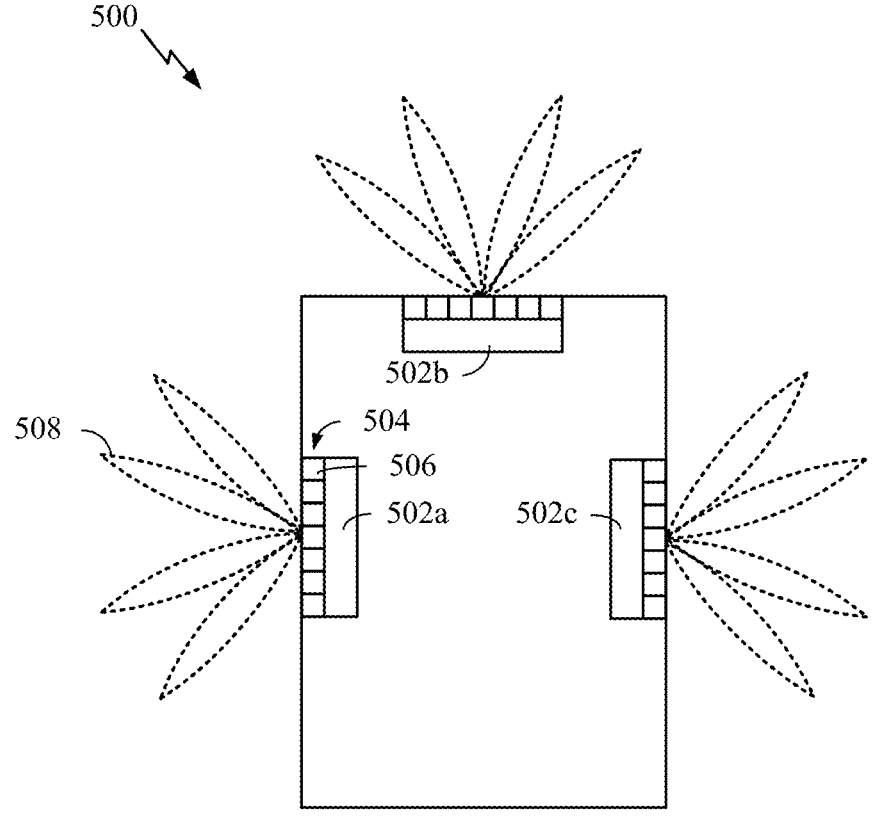
FIG. 5 is a diagram illustrating an example of a UE having multiple antenna modules, in accordance with certain aspects of the present disclosure.

Aspects of the present disclosure provide techniques and apparatus for beam selection for higher uplink performance, exploiting spatial diversity while staying under exposure limits. RF radiation from each antenna module of a UE may be concentrated in a narrow beam (e.g., for mmWave beamformed transmissions), and the beams from different antenna modules may be generally oriented towards different directions that are well separated in space. FIG. 5 is a diagram illustrating an example UE 500 having multiple antenna modules 502a, 502b, 502c (collectively referred to as "antenna modules 502"). Each antenna module 502 is positioned at a different location of the UE 500. Each of the antenna modules 502 may include one or more antenna arrays 504, which may include one or more antenna array elements 506. In aspects, each of the antenna modules 502 may enable beamformed signals to be transmitted or received by the UE 500 via one or more beams 508, which may have varying orientations (e.g., elevation and/or azimuth). The beams 508 may be distributed among the antenna arrays 504 and/or the antenna modules 502. While the antenna modules are depicted as having individual linear arrays in FIG. 5 to facilitate understanding, aspects of the present disclosure may also be applied to antenna modules having multiple linear arrays, an antenna matrix or 2D array of antennas, a rectangular array of antenna elements, or a 3D array of antennas.

Such spatial diversity can be exploited to increase uplink transmission power under an RF exposure scheme that treats each antenna module separately in terms of RF exposure. As the RF exposure from different antenna modules (or a group of antennas and/or antenna modules) of a UE may not overlap in space or may overlap minimally or incompletely, each antenna module can be assigned a separate RF exposure budget and independently accumulate RF exposure consumption when the respective antenna module is selected (and used) for transmission. The UE may perform a time-averaged RF exposure evaluation per antenna module (or group of antennas and/or antenna modules). For example, the UE may track past RF exposure (e.g., RF exposure consumption) per antenna module (or per a group of antennas and/or antenna modules) over a running time window associated with a time-averaged RF exposure limit, for example, as described herein with respect to FIGS. 4A and 4B. In certain aspects, the past RF exposure may be derived from past transmit powers used over the time window. In some examples, one or more of the antenna modules are included in a group including the respective antenna module and one or more other (non-beamforming) antennas, and the past RF exposure is tracked for that group. In some such examples, there will be at most one beamforming antenna array in each group, and thus any tracked RF exposure will be unique or specific to a beamforming antenna array (and not common or shared among multiple such antenna arrays). The UE may track the past RF exposure in terms of past transmit powers used over the time window. The UE may determine a transmit power for a future time interval in the time window per antenna module (or per a group of antennas and/or antenna modules) based on the respective past RF exposure (or past transmit powers) and the time-averaged RF exposure limit. The overall RF exposure budget for a UE with N antenna modules can effectively be increased by N times. The extra RF exposure budget may be provided by spatial diversity of the (N−1) additional antenna modules. Uplink transmission power can be increased when a transmission is switched among different antenna modules, thereby utilizing the extra RF exposure budget. In some examples, a transmit power backoff is applied to one or more of the antenna modules to ensure that the modules are independent with respect to RF exposure.

In certain aspects, a beam may be selected based on an uplink (UL) signal quality, such as a signal-to-noise ratio (SNR), which may convert to a desirable uplink throughput, for example, according to the Shannon channel capacity theorem. The UL signal quality may be indicative of the signal quality of a transmission output by the UE and received at another wireless device, such as a base station. The UE may consider, for each beam, the DL RSRP and a transmit power limit associated with an RF exposure limit. The transmit power limit may represent the maximum transmit power (e.g., with respect to $P_{limit}$ and/or $P_{max}$ of FIGS. 4A and 4B) for a time interval based on the RF exposure limit being averaged over a time window including the time interval, for example as described herein with respect to FIGS. 4A and 4B. As further described herein, the transmit power limit and the DL RSRP may be used to estimate the UL signal quality (e.g., SNR). In certain aspects, the UE may also take into account or consider the heaviness of UL traffic and/or DL traffic over time (e.g., as represented by a ratio or duty cycle of UL and DL traffic over time). As used herein, a duty cycle of transmission(s) may be indicative of a portion (e.g., 5 ms) of a specific period (e.g., 500 ms) in which one or more signals are transmitted. In certain cases, the duty cycle may be standardized (e.g., predetermined) for a specific RAT. For example, the UE may be configured with certain downlink occasions and certain uplink occasions over a time period. In some cases, the duty cycle may vary over time, for example, due to changes in radio conditions, mobility, user behavior, channel availability, etc. In some examples, the duty cycle may be determined by the network and conveyed to the UE.

Referring to FIG. 5, at least one of the beams 508 for the first antenna module 502a may have a stronger DL RSRP than the beams for the other antenna modules 502b, 502c, and the first antenna module 502a may also have a lower transmit power limit than the other antenna modules 502b, 502c, for example, due to past transmission activities that affect the RF exposure budget. In this situation, another antenna module (e.g., the antenna modules 502b, 502c) with a higher RF exposure budget may provide a better UL beam candidate for transmissions at high power levels. The UE may select the antenna module for uplink transmissions based on DL RSRP and the RF exposure budget (among other factors), as further described herein.

The techniques and apparatus for selecting a beam described herein may provide desirable uplink communication performance (e.g., higher uplink throughput and/or desirable cell coverage) in compliance with RF exposure limits.

FIG. 6A is a flow diagram illustrating example operations 600A for wireless communication, in accordance with certain aspects of the present disclosure. The operations 600A may be performed, for example, by a UE (such as the UE 120a in the wireless communication network 100). The operations 600A may be implemented as software components that are executed and run on one or more processors (e.g., controller/processor 280 of FIG. 2). Further, the transmission and reception of signals by the UE in operations 600A may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600A may optionally begin, at block 602, where the UE (e.g., the UE 120a) may receive, from a network entity (e.g., the BS 110), a plurality of signals (e.g., reference signals) via a plurality of beams (e.g., the beams 124, 508). The UE may communicate via the beams, which may be distributed among antennas of the UE, for example, as described herein with respect to FIG. 5. In some cases, the UE may receive the signals via the beams from one or more other wireless device(s), such as a base station or another UE. As an example, the UE 500 may receive a first synchronization signal via a first beam on the first antenna module 502a, a second synchronization signal via a second beam on the second antenna module 502b, and a third synchronization signal via a third beam on the third antenna module 502c. In certain cases, each of the antenna modules may communicate via a plurality of beams, for example, as described herein with respect to FIG. 5. The beams may be distributed among the antenna modules of the UE.

At block 604, the UE may measure a received signal power (e.g., an RSRP) or other beam-specific characteristic (e.g., data or bit error rate, path loss, throughput, some other indicator of signal quality, etc.) for each of the beams, based on the received plurality of signals. For example, the UE 500 may measure an RSRP for each of the first beam, second beam, and third beam associated with the antenna modules 502.

At block 606, the UE may determine a transmit power limit for each of the beams based at least in part on an RF exposure limit, such as the time-averaged RF exposure limit described herein with respect to FIGS. 4A and 4B. For example, the UE 500 may determine a first transmit power limit for the first beam, a second transmit power limit for the second beam, and a third transmit power limit for the third beam associated with the antenna modules 502. In certain cases, the transmit power limit may be representative of the available RF exposure budget over a time interval, e.g., the maximum available transmit power for the time interval that is in compliance with a time-averaged RF exposure limit, for example, as described herein with respect to FIGS. 4A and 4B. As an example, the transmit power limit may be less than or equal to $P_{max}$ and/or $P_{limit}$ as described herein with respect to FIGS. 4A and 4B. The RF exposure limit may include a time-averaged RF exposure limit with a running time window. The RF exposure limit may include at least one of a SAR for a first frequency spectrum (e.g., sub-6 GHz bands) or a power density for a second frequency spectrum (e.g., mmWave bands).

At block 608, the UE may select one of the beams (and/or other beam(s)) based on the received signal powers and the transmit power limits. In certain aspects, the UE may select one of the beams based on estimations of the signal qualities associated with the beams, where the estimations of the signal qualities may include estimations of signal qualities as encountered or received at the other wireless device for each of the beams. The UE may determine an estimation of the signal quality at the other wireless device for each of the beams based at least in part on the received signal powers and the transmit power limits. For example, the UE 500 may select the first beam for transmission if the first beam provides the highest product of the received signal power and the transmit power limit, as further described herein. In certain cases, the UE may select multiple beams for multiple transmissions based on the received signal powers and the transmit power limits as described herein. In some examples, the multiple beams may be used for MIMO communications. In some examples, beams may be selected for certain types of transmissions based on a priority of a communication being transmitted and/or based on resources required to support such communication. For example, a beam with a highest uplink SNR may be selected for a communication with a highest priority (e.g., voice, in some examples), and one or more beams with lower SNR may be selected for lower priority communications (e.g., data, in some examples). In another example, a beam with a highest uplink SNR may be selected for high quality video or low latency communications (e.g., URLLC), whereas a beam with lower SNR may be selected for data relating to email or messaging traffic. In other examples, the UE may transmit information indicative of the estimations of the signal qualities, and/or of the received signal powers and the transmit power limits, to another entity (e.g., a network entity such as a BS 110, for example the network entity from which the plurality of signals were received at block 602) such that the other entity can select one of the beams. In such example, the other entity may transmit the beam selection back to the UE, and the UE may receive the beam selection.

At block 610, the UE may transmit a signal (e.g., a control signal and/or data signal) via the selected beam, for example, to the network entity. For example, the UE may transmit a data signal via the selected beam (e.g., one of the beams 124) to the BS 110a and/or the BS 110b, as illustrated in FIG. 1. In some cases, the UE may transmit the signal to another UE or another wireless device.

In certain aspects, the beam selection at block 608 may consider an estimation of the signal quality (e.g., SNR) at the network entity or the other wireless device. For example, at block 612, the UE may estimate an uplink signal quality (e.g., SNR) at the network entity for each of the beams based at least in part on the received signal power and the transmit power limit for the respective beam. To determine the estimation of the uplink signal qualities, the UE may estimate the uplink SNR at the network entity for each of the beams based at least in part on the received signal power and the transmit power limit for the respective beam. The UE may select one of the beams based on the estimated uplink signal qualities (e.g., SNRs) for the beams. For example, the UE may select one of the beams with the highest estimation of the signal quality among the estimations of the signal qualities associated with the beams. In some cases, the UE may select the beam with the highest uplink SNR among the estimated uplink SNRs. In certain cases, the UE may select the beam with an uplink SNR equal to or greater than a certain threshold. In some cases, the UE may select the beam with an uplink SNR closest to the threshold (if the uplink SNRs are below the threshold). In certain aspects, the UE may select one of the beams with a highest product of the received signal power and the transmit power limit for the respective beam.

The average UL SNR for a certain time interval can be estimated using the downlink RSRP and transmit power limit. The average UL SNR for a transmit beam index j over a time interval (e.g., a future time interval, which may be separate from the running time window for RF exposure compliance) starting from time t may be proportional to the predicted average maximum transmit power (which may be derived from the transmit power limit determined at block 606 as further described herein) and the RSRP (e.g., the received signal power measured at block 604) corresponding to the same beam and time interval. The UE may estimate the uplink SNR as a product of the received signal power and a maximum transmit power (e.g., the predicted average maximum transmit power) for the respective beam, for example, as provided in the following expression:

$$SNR(j, t) = \frac{\overline{P_{max}}(j, t)}{PL(j, t) \cdot P_n} \sim \overline{P_{max}}(j, t) \cdot RSRP(j, t) \quad (1)$$

where PL(j, t) may be the path loss across the channel between the UE and the network entity (or other wireless device) for beam j; $P_n$ may be the noise power; $\overline{P_{max}}(j, t)$ may represent the predicted average maximum transmit power, which, in certain cases, may be derived from the transmit power limit determined at block 606; and RSRP(j, t) may represent the received signal power measured at block 604.

$\overline{P_{max}}(j, t)$ may be computed from the time-averaged RF exposure budget over a given (future) time interval, for example, using the equation that converts RF exposure budget to a maximum transmit power. The time interval for determining $\overline{P_{max}}(j, t)$ may be separate from the RF exposure time window, as described herein with respect to FIGS. 4A and 4B. For example, the time interval for determining $\overline{P_{max}}(j, t)$ may be longer or shorter than the RF exposure time window, such as 10 ms to 500 ms. $\overline{P_{max}}(j, t)$ may be calculated as the average available RF exposure budget (in terms of transmit power) in the given time interval, which can be the remaining time in a running time window or any other suitable time interval in the future, such as the remaining time until the next beam switching decision will be made at the UE or the next running time window. The transmit power limit determined at block 606 may be used to calculate $\overline{P_{max}}(j, t)$. For example, the transmit power limit determined at block 606 may represent a portion of the transmit powers averaged over the given time interval for determining $\overline{P_{max}}(j, t)$. In certain cases, $\overline{P_{max}}(j, t)$ may be equal to the transmit power limit determined at block 606, for example, if the given time interval for determining $\overline{P_{max}}(j, t)$ is equal to the time interval for determining the transmit power limit at block 606, or if the transmit power limit represents the only transmission over the given time interval for determining $\overline{P_{max}}(j, t)$. The available RF exposure budget in the time interval starting from time t may vary among different antenna modules, for example, due to each antenna module having a separate RF exposure budget.

In certain aspects, the estimation of the uplink SNR may be determined in a logarithm (dB) scale as given in the following expression:

$$SNR\text{-}dB(j,t) \sim \overline{P_{max\_dB}}(j,t) + RSRP\_dB(j,t) \quad (2)$$

In certain cases, the UE may estimate the uplink SNR as a sum of logarithmics of the received signal power and a maximum transmit power (e.g., the predicted average maximum transmit power, which may be derived from the transmit power limit) for the respective beam.

In certain aspects, the UE may apply separate time-averaged RF exposure limits to each antenna module in determining the transmit power limits for each beam. For example, at block 606, the UE may determine the transmit power limit for each of the beams based at least in part on a separate time-averaged RF exposure limit for each antenna module used to form the beams. The separate time-averaged RF exposure limits may provide a higher transmit power limit for an antenna module with a lighter uplink traffic history (e.g., fewer occasions of uplink traffic over a time interval) during the RF exposure time window (or any other time period) than another antenna module with a higher uplink traffic history (e.g., greater occasions of uplink traffic over the time interval). For example, suppose the UE 500 has been continuously transmitting with the first antenna module 502a during the RF exposure time window and has not been using the other antenna modules 502b, 502c for uplink traffic. Under such conditions, the transmit power limit for the first antenna module may be less than or equal to $P_{limit}$, whereas the transmit power limits for the second and third antenna modules 502b, 502c may be less than or equal to $P_{max}$ (and greater than $P_{limit}$), due to there being a separate time-averaged RF exposure limit applied to each of the antenna modules. Further, the orientation of the UE and/or the antennas therein, for example in relation to a user or other nearby being, may affect the RF exposure limit. For example, an antenna array located at a top edge of the UE may be associated with a lower RF exposure limit (depending on past exposure) than an antenna array lower on the phone that faces out a back of the UE when the UE is situated such that the array at the top edge is disposed near the user's head and the lower array is disposed and pointed away from the user's body. In some examples, the RF exposure limit and/or tracked (e.g., past) RF exposure is common for all beams associated with a particular antenna array/module. In such examples, however, the transmit power limit (or power settings for individual components such as a DA or PA, or transmit power incident or observed at each transmitting antenna) may vary between beams with a shared RF exposure and/or RF exposure limit, for example based on a number and/or distribution of antenna elements in the array used to form the respective beams.

Similarly, the UE may determine the transmit power limit for each of the beams based at least in part on a separate prediction of average maximum transmit power (e.g., $\overline{P_{max}}(j, t)$) over a time interval for each antenna module used to form the beams. The UE may determine the average maximum transmit power (e.g., $\overline{P_{max}}(j, t)$) based on past RF exposure and/or past transmission history associated with the respective antenna module. The UE may determine the transmit power limit for each of the beams based at least in part on a separate past RF exposure (e.g., as past transmit powers over a time interval or time window associated with a time-averaged RF exposure limit) for each antenna module used to form the beams, where the beams may be distributed among a plurality of antenna modules, for example, as depicted in FIG. 5.

In certain cases, the antenna modules may have varying RF exposure limits. For example, the first antenna module 502a may have a lower (or higher) RF exposure limit than the other antenna modules 502b, 502c, for example, due to differing antenna module design or architectures (such as different power ratings or gains), differing exposure scenarios (e.g., exposure to head, body, hand, or as a hotspot) for the antenna modules, etc.

For certain aspects, the UE may adjust the predicted average maximum transmit power and/or the transmit power limit based on predicted uplink traffic (e.g., an uplink traffic duration) and/or downlink traffic for each antenna module in the given time interval for determining the predicted average maximum transmit power ($\overline{P_{max}}(j, t)$). The uplink traffic duration may be representative of the time period that the UE is predicted, scheduled, configured, or allowed to transmit in the time interval, for example, according to a time division duplex (TDD) configuration or uplink traffic history. The UE may adjust the predicted average maximum transmit power and/or the transmit power limit based on the uplink traffic duration over the given time interval. In certain aspects, the uplink and downlink traffic in the given time interval may be estimated using past uplink and downlink traffic history or a TDD configuration. If a UE can use different antenna beams for UL transmission and DL reception, the UE can switch UL beams based on UL SNR (or on DL RSRP and transmit power limits) and switch DL beams based on DL RSRP. In certain cases, the UE may use the same antenna beams for both UL transmission and DL reception. In such cases, the UE may communicate in a half-duplex mode where the transmissions are received and transmitted at separate times. The UE may apply a tunable parameter to account for the downlink traffic and/or the uplink traffic where the beam may be shared for uplink and downlink traffic, for example, as provided in the following expression for determining an adjusted SNR:

$$M(j, t) \sim \alpha \cdot \overline{P_{max}\_dB}(j, t) + RSRP\_dB(j, t) \qquad (3)$$

where $M(j, t)$ may be the adjusted SNR for beam j at time interval t; and $\alpha$ is a tunable parameter (e.g., $\alpha \in [0, 1]$) based on the uplink traffic and/or downlink traffic history associated with an antenna module over the given time interval. For example, for light downlink traffic (e.g., downlink traffic that lasts less than half of the RF exposure time window) or heavy uplink traffic, $\alpha$ may be greater than 0.5, whereas for heavy downlink traffic (e.g., downlink traffic that lasts longer than half of the RF exposure time window) or light uplink traffic, $\alpha$ may be less than 0.5. In certain aspects, the tunable parameter may be considered a ratio or duty cycle of the downlink traffic and uplink traffic over time. The ratio or duty cycle may be indicative of a percentage of uplink traffic used (or which will be used or predicted to be used) over a time interval or indicative of the uplink traffic duration over the time interval. The UE may adjust a maximum transmit power (e.g., $\overline{P_{max}}(j, t)$) for the RF exposure limit based on a ratio of uplink traffic to downlink traffic (e.g., as a percentage of uplink traffic over time). The UE may determine a product of the maximum transmit power (e.g., $\overline{P_{max}}(j, t)$) and a tunable parameter (e.g., $\alpha$) associated with the ratio of the uplink traffic to downlink traffic, where the product of the maximum transmit power and the tunable parameter represents the adjusted transmit power limit used to determine $M(j, t)$. In aspects, the tunable parameter may include a factor indicative of the uplink and downlink traffic, such as a duty cycle of the uplink traffic to downlink traffic over time or a percentage of uplink traffic over time.

The UE may perform the beam selection periodically (e.g., every 20 ms) or in response to certain events and/or criteria. For example, the UE may perform the beam selection in response to the transmit power being equal to or within a threshold of the RF exposure limit. The UE may perform the beam selection in response to changes in radio conditions. For example, if the DL RSRP is changing slowly over time, then the beam selection may be performed less often, compared to if the DL RSRP is changing rapidly over time or at a poor level, where the beam selection may be performed more often.

FIG. 6B is a flow diagram illustrating example operations 600B for wireless communication. The operations 600B may be performed, for example, by a wireless communication device (such as the UE 120a in the wireless communication network 100).

The operations 600B may optionally begin, at block 620, where the wireless device may receive, from another wireless device (e.g., the BS 110), a plurality of signals via a respective plurality of beams. The plurality of beams may be distributed among a plurality of antenna arrays of the wireless device, for example, as described herein with respect to FIG. 5.

At block 622, the wireless device may measure a first characteristic of each of the received plurality of signals, where the first characteristic is specific to each beam of the plurality of beams. The first beam-specific characteristic may include a received signal quality associated with a respective beam. The first characteristic may include an uplink signal quality associated with a respective beam, where the uplink signal quality is representative of the uplink signal quality received or encountered at the other wireless device.

At block 624, the wireless device may select one of the plurality of beams based on the first beam-specific characteristics and a respective past RF exposure for each of the plurality of antenna arrays, where the past RF exposures are independently tracked for each of the plurality of antenna arrays. The past RF exposures may include contributions for power density associated with the respective antenna array. The respective RF exposure may be common to all beams associated with the respective antenna array of the plurality of antenna arrays. The beam selection may be based on a transmit power limit for each of the plurality of beams, where the transmit power limit may be based on the past RF exposures and varying between beams associated with the respective antenna array.

At block 626, the wireless device may transmit a signal (e.g., a control signal and/or data signal) via the selected beam, for example, as described herein with respect to the operations 600A.

Figure 7:
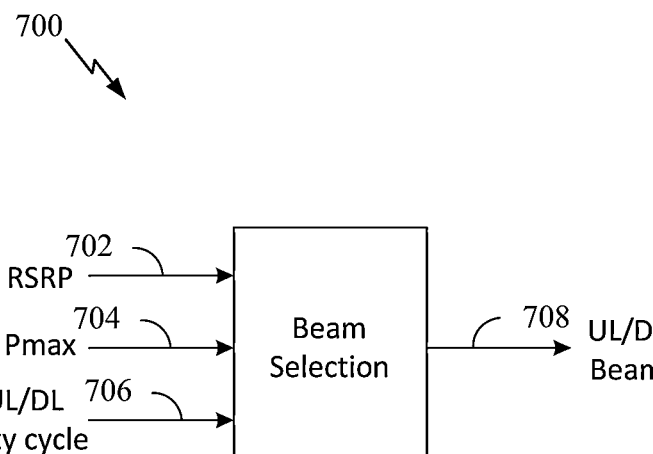
FIG. 7 is a diagram of an example beam selection module, in accordance with certain aspects of the present disclosure.

FIG. 7 is a diagram of an example beam selection module 700, in accordance with certain aspects of the present disclosure. As shown, the beam selection module 700 may take in as inputs: received signal powers 702 (e.g., RSRPs) and transmit power limits 704 (e.g., transmit power limits $\leq P_{max}$ and/or $P_{limit}$) for each of the candidate beams for transmission. In certain cases, the beam selection module 700 may also take in as an input: a tunable parameter (e.g., $\alpha$) associated with a ratio of the uplink traffic to downlink traffic for each of the candidate beams. The beam selection module 700 may select a beam for transmission using the input parameters, for example, to estimate an uplink SNR for each candidate beam. The beam selection module 700 may output an uplink beam 708 (or multiple beams) for transmission based on the beam selection criteria described herein. For example, the beam selection module 700 may select the beam with the highest uplink SNR as estimated with the RSRP and transmit power limit for the respective beam.

Figure 8:
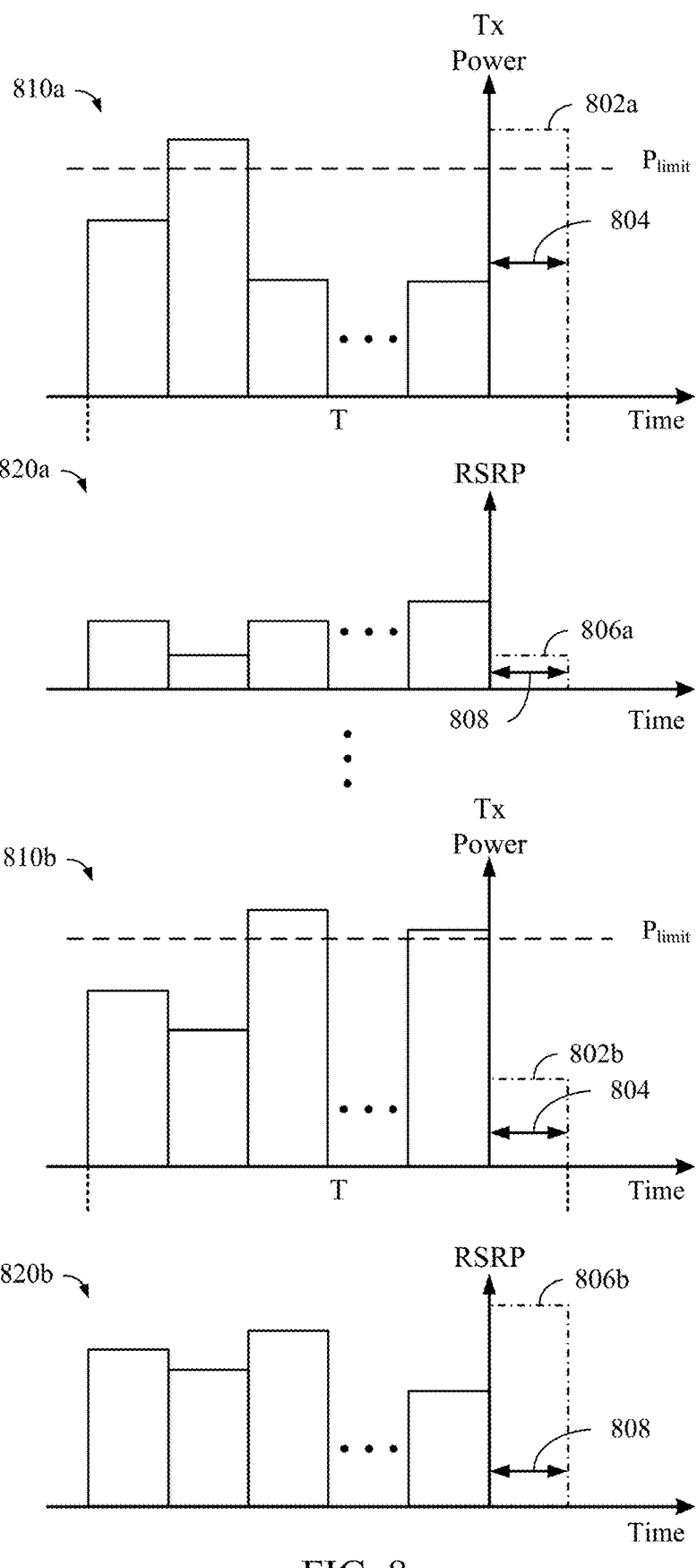
FIG. 8 illustrates transmit power limits and received signal powers over time for various antenna modules, in accordance with certain aspects of the present disclosure.

FIG. 8 illustrates transmit power limits and received signal powers over time for various antenna modules 1-N, in accordance with certain aspects of the present disclosure.

The graphs 810*a*, 810*b* depict the transmit power limits across the time window T for antenna module 1 and N, respectively, and the graphs 820*a*, 820*b* depict the received signal powers over time for certain beams received using antenna module 1 and N, respectively. The graph 810*a* is representative of the transmit power limits determined for antenna module 1 (e.g., the first antenna module 502*a*), and the graph 810*b* is representative of the transmit power limits determined for antenna module N (e.g., the third antenna module 502*c*). The graph 820*a* is representative of the received signals powers measured for certain beam(s) using antenna module 1, and the graph 820*b* is representative of the received signals powers measured for certain beam(s) using antenna module N. In other words, the transmit power limit may be specific to an antenna module (or determined for a beam associated with the antenna module based on an RF exposure common to all beams associated with the antenna module, depending on the configurations of all the beams), which may have specific beams (for example, as described herein with respect to FIG. 5), whereas the received signal powers may be specific to a particular beam of an antenna module. As described herein with respect to FIGS. 6A and 6B, the UE may determine the transmit power limits 802*a*, 802*b* for a first time interval 804 within the time window T using a separate time-averaged RF exposure limit for each of the antenna modules. The UE may also measure the received signal powers 806*a*, 806*b* for a second time interval 808, which may be separate from the first time interval 804, for each of the beams of the respective antenna modules.

In this example, the transmit power limit 802*a* for antenna module 1 may exceed $P_{limit}$, whereas the transmit power limit 802*b* for antenna module N may be less than $P_{limit}$. The received signal power 806*a* for a beam of antenna module 1 may be less than the received signal power 806*b* for a beam of antenna module N. The product of the transmit power limit 802*a* and received signal power 806*a* for the beam of antenna module 1 may yield a higher estimation for the UL SNR compared to the product of the transmit power limit 802*b* and received signal power 806*b* for the beam of antenna module N, for example, due to the relatively low value of the transmit power limit 802*b*. As a result, the UE may select the beam associated with the received signal power 806*a* from antenna module 1 for uplink transmission, for example, due to the beam yielding the highest estimated and/or adjusted UL SNR according to Expression (1), Expression (2), and/or Expression (3). The selection of the beam of antenna module 1 may enable the UE to transmit signals with a desirable transmit power, which, in turn, may result in desirable uplink performance. While the examples depicted in FIG. 8 are described herein with respect to transmit power limits to facilitate understanding, aspects of the present disclosure may be applied to selecting a beam based on a predicted average maximum transmit power ($\overline{P_{max}}(j, t)$) over a given future time interval, which may be any time duration. For example, the time interval associated with $\overline{P_{max}}(j, t)$ may represent the duration of a transmission or the duration that a beam is determined or predicted to be used. In some cases, the time interval associated with $\overline{P_{max}}(j, t)$ may be a future time interval (e.g., slot or fixed time interval) associated with the running time window of a time-averaged RF exposure limit, as depicted in FIG. 8.

It will be appreciated that estimation of the uplink SNR is an example of a property of a signal quality at a receiver used for beam selection. Other receiver-side signal quality properties may be used in addition to or instead of SNR for beam selection. For example, the properties may include, for example, a channel quality indicator, a signal-to-interference-plus-noise ratio (SINR), a signal-to-noise-plus-distortion ratio (SNDR), a received signal strength indicator (RSSI), a reference signal received power (RSRP), a reference signal received quality (RSRQ), and/or a block error rate (BLER).

It will be appreciated that estimation of an uplink transmission is merely an example of a transmission affected by an RF exposure evaluation. Aspects of the present disclosure may be applied to other types of transmissions or RATs, such as sidelink transmissions, shared spectrum transmissions, etc.

Certain descriptions above refer to an antenna module and/or characteristics or functions related to that antenna module. It will be appreciated that such descriptions may apply to an array of antennas regardless of whether that array is packaged into a module. Thus, descriptions of a group of antenna modules may include a group of antenna arrays that are not packaged in modules, a group of antenna arrays that are each implemented as hardware modules, or at least one antenna array packaged as a module and at least one array which is not so packaged. As another example, transmit power limits and/or received signal powers may be determined and/or measured for an antenna array not packaged in a module. A group of antennas may include one or more arrays of antennas not packaged in a module, one or more arrays of antennas packaged into a module, and/or one or more individual antennas (not arranged in an array, for example configured to operate in a non-mmW frequency).

While the examples depicted in FIGS. 5-8 are described herein with respect to a UE performing the beam selection to facilitate understanding, aspects of the present disclosure may also be applied to other wireless communication devices, such as a base station and/or a CPE, performing the beam selection described herein. Further, while the examples are described with respect to communication between the UE (or other wireless device) and a network entity, the UE or other wireless device may be communicating with a device other than a network entity, for example another UE or with another device in a user's home that is not a network entity, for example.

It will be appreciated that the techniques and apparatus for beam selection may provide various advantages, such as desirable uplink performance in compliance with RF exposure standards and/or regulations.

Figure 9:
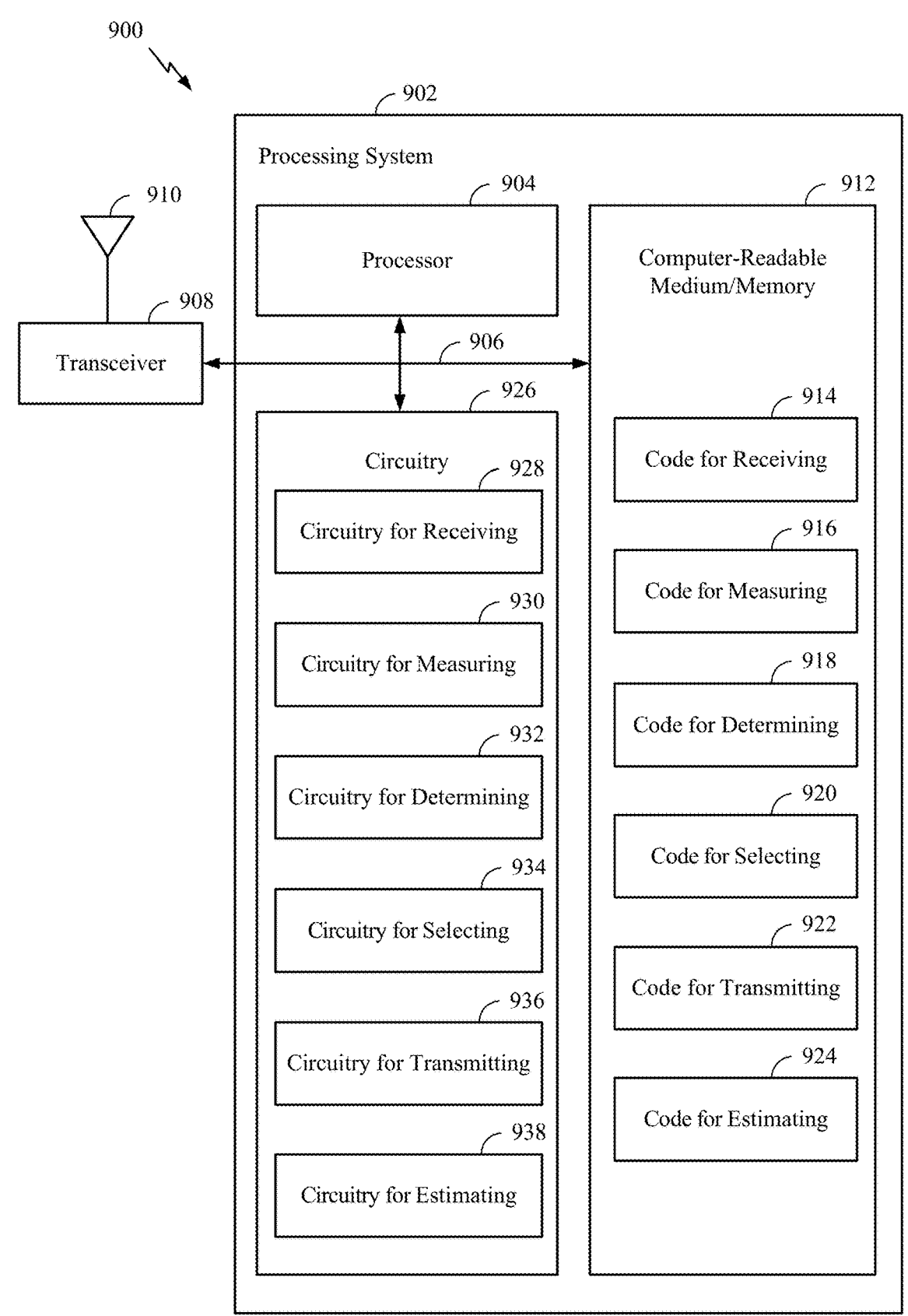
FIG. 9 illustrates a communications device that may include various components configured to perform opera-

FIG. 9 illustrates a communications device 900 that may include various components (e.g., corresponding to means-plus-function components) configured to perform operations for the techniques disclosed herein, such as the operations illustrated in FIG. 6A and/or FIG. 6B. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6A and/or FIG. 6B, or other operations for performing the various techniques discussed herein for beam selection. In certain aspects, computer-readable medium/ memory 912 stores code for receiving 914, code for measuring 916, code for determining 918, code for selecting 920, code for transmitting 922, and/or code for estimating 924. In certain aspects, the processing system 902 has circuitry 926 configured to implement the code stored in the computer-readable medium/memory 912. In certain aspects, the circuitry 926 is coupled to the processor 904 and/or the computer-readable medium/memory 912 via the bus 906. For example, the circuitry 926 includes circuitry for receiving 928, circuitry for measuring 930, circuitry for determining 932, circuitry for selecting 934, circuitry for transmitting 936, and/or circuitry estimating 938.

For example, means for transmitting (or means for outputting for transmission) may include a transmitter and one or more antennas, such as the transceiver 254 and/or antenna (s) 252 of the UE 120a illustrated in FIG. 2 and/or circuitry for transmitting 936 of the communication device 900 in FIG. 9. Means for receiving (or means for obtaining) may include a receiver and/or antenna(s) 252 of the UE 120a illustrated in FIG. 2 and/or circuitry for receiving 928 of the communication device 900 in FIG. 9. Means for measuring, means for determining, means for selecting, and/or means for estimating may include a processing system, which may include one or more processors, such as the receive processor 258, the transmit processor 264, the TX MIMO processor 266, and/or the controller/processor 280 of the UE 120a illustrated in FIG. 2, the processing system 902 of the communication device 900 in FIG. 9, and/or the circuitry for measuring 930, circuitry for determining 932, circuitry for selecting 934, and/or circuitry for estimating 938.

Example Aspects

In addition to the various aspects described above, specific combinations of aspects are within the scope of the disclosure, some of which are detailed below:

Aspect 1: A method of wireless communication by a wireless device, comprising: receiving, from another wireless device, a plurality of signals via a plurality of beams; measuring a received signal power for each of the beams, based on the received plurality of signals; determining a transmit power limit for each of the beams based at least in part on a radio frequency (RF) exposure limit; selecting one of the beams based on the received signal powers and the transmit power limits; and transmitting a signal via the selected beam.

Aspect 2: The method of Aspect 1, wherein the selecting comprises selecting the one of the beams with a highest product between the received signal power and a maximum transmit power derived from the transmit power limit for the respective beam.

Aspect 3: The method of Aspect 1, wherein the selecting comprises: estimating an uplink signal-to-noise ratio (SNR) at the other wireless device for each of the beams based at least in part on the received signal power and the transmit power limit for the respective beam; and selecting the one of the beams based on the estimated uplink SNRs.

Aspect 4: The method of Aspect 3, wherein the selecting comprises selecting the one of the beams with a highest estimated uplink SNR among the estimated uplink SNRs.

Aspect 5: The method according to any of Aspects 3 or 4, wherein estimating the uplink SNR comprises estimating the uplink SNR as a product between the received signal power and a maximum transmit power derived from the transmit power limit for the respective beam.

Aspect 6: The method according to any of Aspects 3 or 4, wherein estimating the uplink SNR comprises estimating the uplink SNR as a sum between logarithmics of the received signal power and a maximum transmit power derived from the transmit power limit for the respective beam.

Aspect 7: The method according to any of Aspects 1-6, wherein determining the transmit power limit for each of the beams comprises determining the transmit power limit for each of the beams based at least in part on a separate time-averaged RF exposure limit for each antenna module used to form the beams.

Aspect 8: The method according to any of Aspects 1-7, wherein determining the transmit power limit for each of the beams comprises adjusting a maximum transmit power for the RF exposure limit based on a ratio between uplink and downlink traffic.

Aspect 9: The method of Aspect 8, wherein determining the transmit power limit for each of the beams comprises determining a product between the maximum transmit power and a tunable parameter associated with the ratio between the uplink and downlink traffic.

Aspect 10: The method according to any of Aspects 1-9, wherein the RF exposure limit includes a time-averaged RF exposure limit.

Aspect 11: The method according to any of Aspects 1-10, wherein the RF exposure limit includes a power density for mmWave bands.

Aspect 12: The method according to any of Aspects 1-11, wherein the wireless device comprises a user equipment.

Aspect 13: The method according to Aspect 12, wherein the other wireless device comprises a network entity.

Aspect 14: The method according to Aspect 13, wherein the transmitting the signal via the selected beam comprises transmitting an uplink communication to the network entity.

Aspect 15: The method according to Aspect 12, wherein the other wireless device comprises a base station.

Aspect 16: The method according to Aspect 12, wherein the other wireless device comprises a customer premises equipment.

Aspect 17: The method according to any of Aspects 1-11, wherein the wireless device comprises a customer premises equipment.

Aspect 18: The method according to any of Aspects 1-11 and 17, wherein the other wireless device comprises a user equipment.

Aspect 19: An apparatus, comprising: a memory comprising executable instructions; one or more processors configured to execute the executable instructions and cause the apparatus to perform a method in accordance with any of Aspects 1-18, 23-32, or 53-57.

Aspect 20: An apparatus, comprising means for performing a method in accordance with any of Aspects 1-18, 23-32, or 53-57.

Aspect 21: A computer-readable medium comprising executable instructions that, when executed by one or more processors of an apparatus, cause the apparatus to perform a method in accordance with any of Aspects 1-18, 23-32, or 53-57.

Aspect 22: A computer program product embodied on a computer-readable storage medium comprising code for performing a method in accordance with any of Aspects 1-18, 23-32, or 53-57.

Aspect 23: A method of wireless communication by a wireless device, comprising: receiving, from another wireless device, a plurality of signals via a plurality of beams; measuring a received signal power for each of the beams, based on the received plurality of signals; determining a transmit power limit for each of the beams based at least in part on a radio frequency (RF) exposure limit; determining an estimation of a signal quality at the other wireless device for each of the beams based at least in part on the received signal powers and the transmit power limits; selecting one of the beams based on the estimations of the signal qualities for the beams; and transmitting a signal via the selected beam.

Aspect 24: The method of Aspect 23, wherein the selecting comprises selecting the one of the beams with a highest signal quality among the estimations of the signal qualities.

Aspect 25: The method of Aspect 23 or 24, wherein: determining the estimation of the signal quality comprises estimating an uplink signal-to-noise ratio (SNR) at the other wireless device for each of the beams based at least in part on the received signal power and the transmit power limit for the respective beam; and selecting the one of the beams comprises selecting the one of the beams based on the estimated uplink SNRs.

Aspect 26: The method of Aspect 25, wherein the selecting comprises selecting the one of the beams with a highest estimated uplink SNR among the estimated uplink SNRs.

Aspect 27: The method of Aspect 25 or 26, wherein estimating the uplink SNR comprises estimating the uplink SNR as a product of the received signal power and a maximum transmit power derived from the transmit power limit for the respective beam.

Aspect 28: The method according to any of Aspects 23-27, wherein determining the transmit power limit for each of the beams comprises determining the transmit power limit for each of the beams based at least in part on a separate prediction of average maximum transmit power over a time interval for each antenna module used to form the beams.

Aspect 29: The method according to any of Aspects 23-28, wherein determining the transmit power limit for each of the beams comprises determining the transmit power limit for each of the beams based at least in part on a separate past RF exposure for each of a plurality of antenna arrays of the wireless device used to form the beams, wherein the beams are distributed among the plurality of antenna arrays.

Aspect 30: The method according to any of Aspects 23-29, wherein determining the transmit power limit for each of the beams comprises adjusting a maximum transmit power for the RF exposure limit based on an uplink traffic duration over a time interval.

Aspect 31: The method of Aspect 30, wherein determining the transmit power limit for each of the beams comprises determining a product of the maximum transmit power and a tunable parameter associated with the uplink traffic duration over the time interval.

Aspect 32: The method according to any of Aspects 23-31, wherein the RF exposure limit includes a time-averaged RF exposure limit associated with a power density for mmWave bands.

Aspect 33: An apparatus for wireless communication, comprising: a memory; and a processor coupled to the memory, the processor being configured to: receive, from a wireless device, a plurality of signals via a plurality of beams, measure a received signal power for each of the beams, based on the received plurality of signals, determine a transmit power limit for each of the beams based at least in part on a radio frequency (RF) exposure limit, determine an estimation of a signal quality at the wireless device for each of the beams based at least in part on the received signal powers and the transmit power limits, select one of the beams based on the estimations of the signal qualities for the beams, and transmit a signal via the selected beam.

Aspect 34: The apparatus of Aspect 33, wherein to select the one of the beams, the processor is configured to select the one of the beams with a highest estimation of a signal quality among the estimations of the signal qualities.

Aspect 35: The apparatus of Aspect 33 or 34, wherein: to determine the estimation of the signal quality, the processor is further configured to estimate an uplink signal-to-noise ratio (SNR) at the wireless device for each of the beams based at least in part on the received signal power and the transmit power limit for the respective beam; and to select the one of the beams, the processor is further configured to select the one of the beams based on the estimated uplink SNRs.

Aspect 36: The apparatus of Aspect 35, wherein to select the one of the beams, the processor is configured to select the one of the beams with a highest estimated uplink SNR among the estimated uplink SNRs.

Aspect 37: The apparatus of Aspect 35 or 36, wherein to estimate the uplink SNR, the processor is further configured to estimate the uplink SNR as a product of the received signal power and a maximum transmit power derived from the transmit power limit for the respective beam.

Aspect 38: The apparatus according to any of Aspects 35-37, wherein to determine the transmit power limit for each of the beams, the processor is further configured to determine the transmit power limit for each of the beams based at least in part on a separate prediction of average maximum transmit power over a time interval for each antenna module used to form the beams.

Aspect 39: The apparatus according to any of Aspects 33-38, wherein to determine the transmit power limit for each of the beams, the processor is further configured to determine the transmit power limit for each of the beams based at least in part on a separate past RF exposure for each antenna module used to form the beams, wherein the beams are distributed among a plurality of antenna modules.

Aspect 40: The apparatus according to any of Aspects 33-39, wherein to determine the transmit power limit for each of the beams, the processor is further configured to adjust a maximum transmit power for the RF exposure limit based on an uplink traffic duration over a time interval.

Aspect 41: The apparatus of Aspect 40, wherein to determine the transmit power limit for each of the beams, the processor is further configured to determine a product of the maximum transmit power and a tunable parameter associated with the uplink traffic duration over the time interval.

Aspect 42: The apparatus according to any of Aspects 33-41, wherein the RF exposure limit includes a time-averaged RF exposure limit associated with a power density for mmWave bands.

Aspect 43: An apparatus for wireless communication, comprising: means for receiving, from another wireless device, a plurality of signals via a plurality of beams; means for measuring a received signal power for each of the beams, based on the received plurality of signals; means for determining a transmit power limit for each of the beams based at least in part on a radio frequency (RF) exposure limit; means for determining an estimation of a signal quality at the other wireless device for each of the beams based at least in part on the received signal powers and the transmit power limits; means for selecting one of the beams based on the estimations of the signal qualities for the beams; and means for transmitting a signal via the selected beam.

Aspect 44: The apparatus of Aspect 43, wherein the means for selecting is configured to select the one of the beams with a highest signal quality among the estimations of the signal qualities.

Aspect 45: The apparatus of Aspect 43 or 44, wherein: the means for determining the estimation of the signal quality is configured to estimate an uplink signal-to-noise ratio (SNR) at the other wireless device for each of the beams based at least in part on the received signal power and the transmit power limit for the respective beam; and the means for selecting the one of the beams is configured to select the one of the beams based on the estimated uplink SNRs.

Aspect 46: The apparatus of Aspect 45, wherein the means for selecting is configured to select the one of the beams with a highest estimated uplink SNR among the estimated uplink SNRs.

Aspect 47: The apparatus of Aspect 45 or 46, wherein the means for estimating the uplink SNR is configured to estimate the uplink SNR as a product of the received signal power and a maximum transmit power derived from the transmit power limit for the respective beam.

Aspect 48: The apparatus according to any of Aspects 43-47, wherein the means for determining the transmit power limit for each of the beams is configured to determine the transmit power limit for each of the beams based at least in part on a separate prediction of average maximum transmit power over a time interval for each antenna module used to form the beams.

Aspect 49: The apparatus according to any of Aspects 43-48, wherein the means for determining the transmit power limit for each of the beams is configured to determine the transmit power limit for each of the beams based at least in part on a separate past RF exposure for each of a plurality of antenna arrays of the wireless device used to form the beams, wherein the beams are distributed among the plurality of antenna arrays.

Aspect 50: The apparatus according to any of Aspects 43-49, wherein the means for determining the transmit power limit for each of the beams is configured to adjust a maximum transmit power for the RF exposure limit based on an uplink traffic duration over a time interval.

Aspect 51: The apparatus of Aspect 50, wherein the means for determining the transmit power limit for each of the beams is configured to determine a product of the maximum transmit power and a tunable parameter associated with the uplink traffic duration over the time interval.

Aspect 52: The apparatus according to any of Aspects 43-51, wherein the RF exposure limit includes a time-averaged RF exposure limit associated with a power density for mmWave bands.

Aspect 53: A method of wireless communication by a wireless device, comprising: receiving, from another wireless device, a plurality of signals via a respective plurality of beams, wherein the plurality of beams are distributed among a plurality of antenna arrays of the wireless device; measuring a first characteristic of each of the received plurality of signals, wherein the first characteristic is specific to each beam of the plurality of beams; selecting one of the plurality of beams based on the first beam-specific characteristics and a respective past radio frequency (RF) exposure for each of the plurality of antenna arrays, wherein the past RF exposures are independently tracked for each of the plurality of antenna arrays; and transmitting a signal via the selected beam.

Aspect 54: The method of Aspect 53, wherein the respective RF exposure is common to all beams associated with the respective antenna array of the plurality of antenna arrays.

Aspect 55: The method of Aspect 53 or 54, wherein the selecting is based on a transmit power limit for each of the plurality of beams, the transmit power limit being based on the past RF exposures and varying between beams associated with the respective antenna array.

Aspect 56: The method according to any of Aspects 53-55, wherein the first beam-specific characteristic comprises a received signal quality and the past RF exposures include contributions for power density.

Aspect 57: The method according to any of Aspects 53-56, wherein the selecting is based on a product of the first beam-specific characteristic and a maximum transmit power derived from the respective past RF exposure for each beam of the plurality of beams.

Aspect 58: An apparatus for wireless communication, comprising: a plurality of antenna arrays; a memory; and a processor coupled to the memory, the processor being configured to: receive, from a wireless device, a plurality of signals via a respective plurality of beams, wherein the plurality of beams are distributed among the plurality of antenna arrays; measure a first characteristic of each of the received plurality of signals, wherein the first characteristic is specific to each beam of the plurality of beams; select one of the plurality of beams based on the first beam-specific characteristics and a respective past radio frequency (RF) exposure for each of the plurality of antenna arrays, wherein the past RF exposures are independently tracked for each of the plurality of antenna arrays; and transmit a signal via the selected beam.

Aspect 59: The apparatus of Aspect 58, wherein the respective RF exposure is common to all beams associated with the respective antenna array of the plurality of antenna arrays.

Aspect 60: The apparatus of Aspect 58 or 59, wherein the processor is configured to select the beam based on a transmit power limit for each of the plurality of beams, the transmit power limit being based on the past RF exposures and correlating with different transmit powers for antennas in the respective antenna array.

Aspect 61: The apparatus according to any of Aspects 58-60, wherein the first beam-specific characteristic comprises a received signal quality and the past RF exposures include contributions for power density.

Aspect 62: The apparatus according to any of Aspects 58-61, wherein the processor is configured to select the beam based on a product of the first beam-specific characteristic and a maximum transmit power derived from the respective past RF exposure for each beam of the plurality of beams.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6A and/or FIG. 6B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above.

The invention claimed is:

1. A method of wireless communication by a wireless device, comprising:
   receiving, from another wireless device, a plurality of signals via a plurality of beams;
   measuring a received signal power for each of the beams, based on the received plurality of signals;
   determining a transmit power limit for each of the beams based at least in part on a radio frequency (RF) exposure limit;
   determining an estimation of a signal quality at the other wireless device for each of the beams based at least in part on the received signal powers and the transmit power limits, wherein determining the estimation of the signal quality comprises estimating an uplink signal-to-noise ratio (SNR) at the other wireless device for each of the beams based at least in part on the received signal power and the transmit power limit for the respective beam;
   selecting one of the beams based on the estimations of the signal qualities for the beams, wherein selecting the one of the beams comprises selecting the one of the beams based on the estimated uplink SNRs; and
   transmitting a signal via the selected beam.

2. The method of claim 1, wherein the selecting comprises selecting the one of the beams with a highest estimated uplink SNR among the estimated uplink SNRs.

3. The method of claim 1, wherein estimating the uplink SNR comprises estimating the uplink SNR as a product of the received signal power and a maximum transmit power derived from the transmit power limit for the respective beam.

4. The method of claim 1, wherein determining the transmit power limit for each of the beams comprises determining the transmit power limit for each of the beams based at least in part on a separate prediction of average maximum transmit power over a time interval for each antenna module used to form the beams.

5. The method of claim 1, wherein determining the transmit power limit for each of the beams comprises determining the transmit power limit for each of the beams based at least in part on a separate past RF exposure for each of a plurality of antenna arrays of the wireless device used to form the beams, wherein the beams are distributed among the plurality of antenna arrays.

6. The method of claim 1, wherein determining the transmit power limit for each of the beams comprises adjusting a maximum transmit power for the RF exposure limit based on an uplink traffic duration over a time interval.

7. The method of claim 6, wherein determining the transmit power limit for each of the beams comprises determining a product of the maximum transmit power and a tunable parameter associated with the uplink traffic duration over the time interval.

8. The method of claim 1, wherein the RF exposure limit includes a time-averaged RF exposure limit associated with a power density for mmWave bands.

9. An apparatus for wireless communication, comprising:
   memory; and
   one or more processors coupled to the memory, the one or more processors being configured, individually or collectively, to:

receive, from a wireless device, a plurality of signals via a plurality of beams;
measure a received signal power for each of the beams, based on the received plurality of signals;
determine a transmit power limit for each of the beams based at least in part on a radio frequency (RF) exposure limit;
determine an estimation of a signal quality at the wireless device for each of the beams based at least in part on the received signal powers and the transmit power limits, wherein to determine the estimation of the signal quality, the one or more processors are further configured, individually or collectively, to estimate an uplink signal-to-noise ratio (SNR) at the wireless device for each of the beams based at least in part on the received signal power and the transmit power limit for the respective beam;
select one of the beams based on the estimations of the signal qualities for the beams, wherein to select the one of the beams, the one or more processors are further configured, individually or collectively, to select the one of the beams based on the estimated uplink SNRs; and
transmit a signal via the selected beam.

10. The apparatus of claim 9, wherein to select the one of the beams, the one or more processors are configured, individually or collectively, to select the one of the beams with a highest estimated uplink SNR among the estimated uplink SNRs.

11. The apparatus of claim 9, wherein to estimate the uplink SNR, the one or more processors are further configured, individually or collectively, to estimate the uplink SNR as a product of the received signal power and a maximum transmit power derived from the transmit power limit for the respective beam.

12. The apparatus of claim 9, wherein to determine the transmit power limit for each of the beams, the one or more processors are further configured, individually or collectively, to determine the transmit power limit for each of the beams based at least in part on a separate prediction of average maximum transmit power over a time interval for each antenna module used to form the beams.

13. The apparatus of claim 9, wherein to determine the transmit power limit for each of the beams, the one or more processors are further configured, individually or collectively, to determine the transmit power limit for each of the beams based at least in part on a separate past RF exposure for each antenna module used to form the beams, wherein the beams are distributed among a plurality of antenna modules.

14. The apparatus of claim 9, wherein to determine the transmit power limit for each of the beams, the one or more processors are further configured, individually or collectively, to adjust a maximum transmit power for the RF exposure limit based on an uplink traffic duration over a time interval.

15. The apparatus of claim 14, wherein to determine the transmit power limit for each of the beams, the one or more processors are further configured, individually or collectively, to determine a product of the maximum transmit power and a tunable parameter associated with the uplink traffic duration over the time interval.

16. The apparatus of claim 9, wherein the RF exposure limit includes a time-averaged RF exposure limit associated with a power density for mmWave bands.

17. A method of wireless communication by a wireless device, comprising:

US 12,597,978 B2

35 receiving, from another wireless device, a plurality of signals via a plurality of beams;

measuring a received signal power for each of the beams, based on the received plurality of signals;

determining a transmit power limit for each of the beams based at least in part on a radio frequency (RF) exposure limit, wherein determining the transmit power limit for each of the beams comprises:

adjusting a maximum transmit power for the RF exposure limit based on an uplink traffic duration over a time interval; and determining a product of the maximum transmit power and a tunable parameter associated with the uplink traffic duration over the time interval;

determining an estimation of a signal quality at the other wireless device for each of the beams based at least in part on the received signal powers and the transmit power limits;

selecting one of the beams based on the estimations of the signal qualities for the beams; and transmitting a signal via the selected beam.

18. The method of claim 17, wherein:

determining the estimation of the signal quality comprises estimating an uplink signal-to-noise ratio (SNR) at the other wireless device for each of the beams based at least in part on the received signal power and the transmit power limit for the respective beam; and selecting the one of the beams comprises selecting the one of the beams based on the estimated uplink SNRs.

19. The method of claim 18, wherein the selecting comprises selecting the one of the beams with a highest estimated uplink SNR among the estimated uplink SNRs.

20. The method of claim 18, wherein estimating the uplink SNR comprises estimating the uplink SNR as a product of the received signal power and a maximum transmit power derived from the transmit power limit for the respective beam.

21. The method of claim 17, wherein determining the transmit power limit for each of the beams comprises determining the transmit power limit for each of the beams based at least in part on a separate prediction of average maximum transmit power over a time interval for each antenna module used to form the beams.

22. The method of claim 17, wherein determining the transmit power limit for each of the beams comprises determining the transmit power limit for each of the beams based at least in part on a separate past RF exposure for each of a plurality of antenna arrays of the wireless device used to form the beams, wherein the beams are distributed among the plurality of antenna arrays.

23. The method of claim 17, wherein the RF exposure limit includes a time-averaged RF exposure limit associated with a power density for mmWave bands.

24. An apparatus for wireless communication, comprising:

memory; and one or more processors coupled to the memory, the one or more processors being configured, individually or collectively, to:

receive, from a wireless device, a plurality of signals via a plurality of beams;

36 measure a received signal power for each of the beams, based on the received plurality of signals;

determine a transmit power limit for each of the beams based at least in part on a radio frequency (RF) exposure limit, wherein to determine the transmit power limit for each of the beams, the one or more processors are further configured, individually or collectively, to:

adjust a maximum transmit power for the RF exposure limit based on an uplink traffic duration over a time interval; and determine a product of the maximum transmit power and a tunable parameter associated with the uplink traffic duration over the time interval;

determine an estimation of a signal quality at the wireless device for each of the beams based at least in part on the received signal powers and the transmit power limits;

select one of the beams based on the estimations of the signal qualities for the beams; and transmit a signal via the selected beam.

25. The apparatus of claim 24, wherein:

to determine the estimation of the signal quality, the one or more processors are further configured, individually or collectively, to estimate an uplink signal-to-noise ratio (SNR) at the wireless device for each of the beams based at least in part on the received signal power and the transmit power limit for the respective beam; and to select the one of the beams, the one or more processors are further configured, individually or collectively, to select the one of the beams based on the estimated uplink SNRs.

26. The apparatus of claim 25, wherein to select the one of the beams, the one or more processors are further configured, individually or collectively, to select the one of the beams with a highest estimated uplink SNR among the estimated uplink SNRs.

27. The apparatus of claim 25, wherein to estimate the uplink SNR, the one or more processors are further configured, individually or collectively, to estimate the uplink SNR as a product of the received signal power and a maximum transmit power derived from the transmit power limit for the respective beam.

28. The apparatus of claim 24, wherein to determine the transmit power limit for each of the beams, the one or more processors are further configured, individually or collectively, to determine the transmit power limit for each of the beams based at least in part on a separate prediction of average maximum transmit power over a time interval for each antenna module used to form the beams.

29. The apparatus of claim 24, wherein to determine the transmit power limit for each of the beams, the one or more processors are further configured, individually or collectively, to determine the transmit power limit for each of the beams based at least in part on a separate past RF exposure for each antenna module used to form the beams, wherein the beams are distributed among a plurality of antenna modules.

30. The apparatus of claim 24, wherein the RF exposure limit includes a time-averaged RF exposure limit associated with a power density for mmWave bands.

* * * * *